United States Patent
Tengeiji et al.

(10) Patent No.: US 7,339,756 B2
(45) Date of Patent: Mar. 4, 2008

(54) LENS DRIVING DEVICE

(75) Inventors: Hideki Tengeiji, Kanagawa-ken (JP); Yasufumi Nakaaki, Kanagawa-ken (JP)

(73) Assignee: Victor Company of Japan, Limited, Yokohoma (JP)

( * ) Notice: Subject to any disclaimer, the term of this patent is extended or adjusted under 35 U.S.C. 154(b) by 0 days.

(21) Appl. No.: 11/785,135

(22) Filed: Apr. 16, 2007

(65) Prior Publication Data
US 2007/0263300 A1 Nov. 15, 2007

(30) Foreign Application Priority Data
Apr. 28, 2006 (JP) .......................... P2006-126233

(51) Int. Cl.
*G02B 7/02* (2006.01)
*G02B 15/14* (2006.01)
(52) U.S. Cl. .......................... 359/811; 359/823; 359/694
(58) Field of Classification Search ................ 359/811, 359/823, 824, 694, 814
See application file for complete search history.

(56) References Cited

U.S. PATENT DOCUMENTS 5,812,330 A * 9/1998 Akada .......................... 359/823
7,038,859 B2 * 5/2006 Tsuzuki ........................ 359/704
7,126,763 B2 * 10/2006 Sasaki .......................... 359/696

FOREIGN PATENT DOCUMENTS

JP 06-174992 6/1994

* cited by examiner

*Primary Examiner*—M. Hasan
(74) *Attorney, Agent, or Firm*—The Nath Law Group; Jerald L. Meyer; Derek Richmond

(57) ABSTRACT

A lens driving device includes a focus lens frame, first and second shafts, a rack member, a lead screw and a spring member. One or more lenses are attached to the focus lens frame. The first and second guide shafts are arranged parallel to an optical axis of one or more lenses, inserted into first and second holes of the focus lens frame and guide the focus lens frame. The rack member is supported by the focus lens frame in the vicinity of the first hole. The lead screw meshes with rack teeth formed on the rack member to move the focus lens frame along the optical axis. The spring member presses the rack teeth toward the lead screw to generate reaction force acting from the lead screw toward the rack teeth. A direction in which the reaction force acts crosses a face connecting the first and second guide shafts.

4 Claims, 10 Drawing Sheets

LENS DRIVING DEVICE

BACKGROUND OF THE INVENTION

1. Field of the Invention

The present invention relates to a lens driving device mounted in a lens tube of an optical machine such as a video camera and configured to move a lens frame to which a lens (or lens assembly) is fixed, in the direction of an optical axis of the lens along first and second guide shafts arranged parallel to the optical axis.

2. Description of the Related Art

There is an optical device configured to smoothly move an optical element frame mounted to the optical device along an optical axis without trembling an image even if an engagement portion of the optical element frame has deviation factors. This optical device is disclosed in Japanese Patent Laid-open Publication No. H06(1994)-174992.

As shown in FIG. 1, the optical device 100 comprises an optical element 101, an optical element frame 102, a first guide shaft 103, a second guide shaft 104, a rack member 105, a motor 106, a feed screw 107 and a torsion spring 108.

The optical device 100 moves the optical element frame 102 to which the optical element 101 is fixed, in the direction of an optical axis K' of the optical element 101 along the first and second guide shafts 103 and 104 arranged parallel to the optical axis K'. The rack member 105 is mounted swingablly to the optical element frame 102 below the first guide shaft 103 and capable of swinging in a direction perpendicular to the optical axis K'. The rack member 105 has a rack piece 105a and a rack biasing piece 105b which extend downward from an upper portion thereof and are arranged at a distance. The rack piece 105a is provided with rack teeth 105a1 on the inner surface thereof. The feed screw 107 is fixed to an output shaft of the motor 106 at one end portion thereof. The feed screw 107 is inserted between the rack piece 105a and the rack biasing piece 105b. The rack biasing piece 105b is pressed toward the feed screw 107 by biasing force of the torsion spring 108, which allows the feed screw 107 to mesh with the rack teeth 105a1 while the feed screw 107 is sandwiched between the rack piece 105a and the rack biasing piece 105b.

As shown in FIG. 2, an abutting face 105b1 of the rack biasing piece 105b leans at an angle $\alpha°$ with respect to the rack teeth 105a1. Under this configuration, when the feed screw 107 meshes with the rack teeth 105a1 by pressing the rack biasing piece 105b toward the feed screw 107 by the biasing force of the torsion spring 108, sandwiching force acts from the rack piece 105a and the rack biasing piece 105b to the feed screw 107 to generate reaction force in an arrow direction 109.

Therefore, even if an engagement portion of the optical element frame 102 has deviation factors due to eccentricity and/or warpage of the feed screw 107, the optical element frame 102 can move along the optical axis K' without trembling by setting the optical element frame's own weight and the leaning of the abutting face 105b1 such that the sum of the optical element frame's own weight and the reaction force generated in the arrow direction 109 is larger than trembling force (friction force) acting between the optical element frame 102 and the rack member 105.

However, if the accuracy of leaning of the abutting face 105b1 is low, overload is added to the feed screw 107 when the feed screw 107 is sandwiched between the rack piece 105a and the rack biasing piece 105b. This brings a problem that the optical element frame 102 can not smoothly move along the optical axis K'.

Further, in the optical device 100, there is no consideration for leaning of the optical element frame 102, which will occur at a time when the feed screw 107 rotates in a clockwise direction or an anticlockwise direction, due to lead angles of the rack teeth 105a1 and the feed screw 107.

SUMMARY OF THE INVENTION

The present invention has an object to provide a lens driving device capable of preventing a lens frame to which a lens (lens assembly) is fixed from leaning when the lens frame moves along first and second guide shafts arranged parallel to an optical axis of the lens.

In order to achieve the above object, the present invention provides a lens driving device comprising: a lens frame to which one or more lenses are attached; a first guide shaft arranged parallel to an optical axis of the one or more lenses, inserted into a first hole of the lens frame and configured to guide the lens frame to move along the optical axis; a second guide shaft arranged parallel to the optical axis, inserted into a second hole of the lens frame which is opposed to the first hole across the optical axis and configured to guide the lens frame in cooperation with the first guide shaft to move along the optical axis; a rack member on which rack teeth are formed along the optical axis and supported by the lens frame in the vicinity of the first hole so that the rack member can swing in a direction perpendicular to the optical axis; a lead screw configured to mesh with the rack teeth, which each leans at an angle substantially coinciding with a lead angle of the lead screw, to move the lens frame forward or backward along the optical axis at a time of rotating in a clockwise direction or an anticlockwise direction by using a drive power of a motor; and a spring member configured to press the rack teeth toward the lead screw to generate reaction force acting from the lead screw toward the rack teeth, wherein the rack teeth are formed on the rack member such that a direction in which the reaction force acts crosses a face connecting the first and second guide shafts.

According to the present invention, the rack teeth are formed on the rack member such that the direction in which the reaction force acts crosses the face connecting the first and second guide shafts, which prevents the lens frame from rotating around the optical axis because moment acts so as to press the lens frame toward the first and second guide shafts in the direction of gravitational force by using the reaction force.

In a preferred embodiment of the present invention, moment given to the lens frame due to a vertical component of the reaction force is set such that it is always larger than the sum of moment given to the lens frame due to reaction force forced by the lead angle of the lead screw at a time when the lead screw rotates and moment given to the lens frame due to gravity of the lens frame to which the one or more lenses are attached, in a case where a supporting point is a contact point where the first guide shaft contacts an inner wall of the first hole adjacent to a barycentric position of the lens frame to which the one or more lenses are attached.

According to this embodiment, an image tremble or an image jump does not occur because the lens frame does not rise from the first guide shaft due to the reaction force forced by the lead angle of the lead screw not to lean around the supporting point.

DESCRIPTION OF THE PREFERRED EMBODIMENTS

A lens driving device according to an exemplary embodiment of the present invention will be described below in detail, with reference to FIGS. 3 to 7.

Generally, a portable optical machine such as a video camera includes a lens tube used to take a subject image. The lens tube receives various optical components therein.

Figure 1:
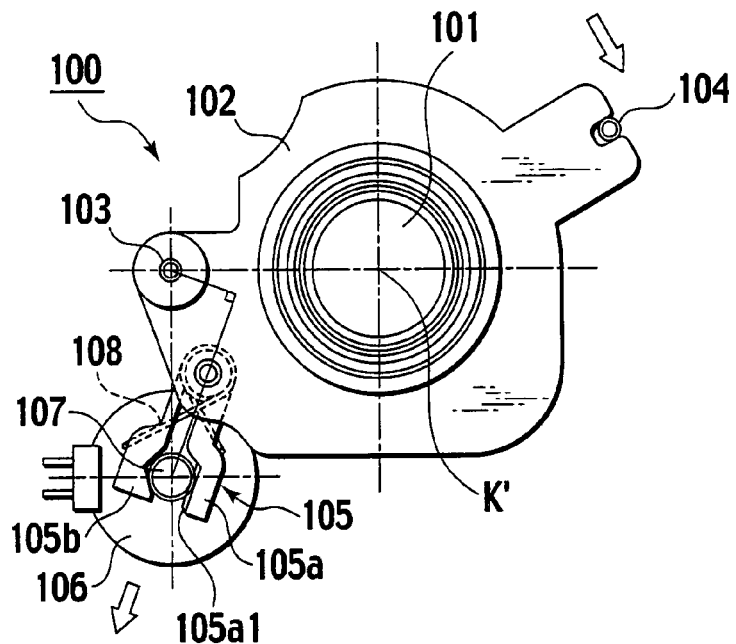
FIG. 1 is a front view of a conventional optical device.
Figure 2:
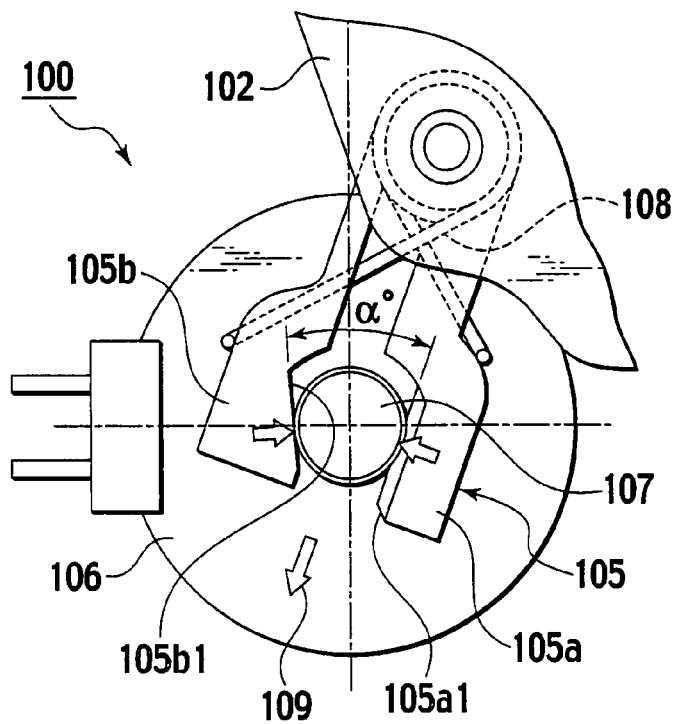
FIG. 2 is an enlarged front view of a portion where a feed screw meshes rack teeth in the conventional optical device.
Figure 3:
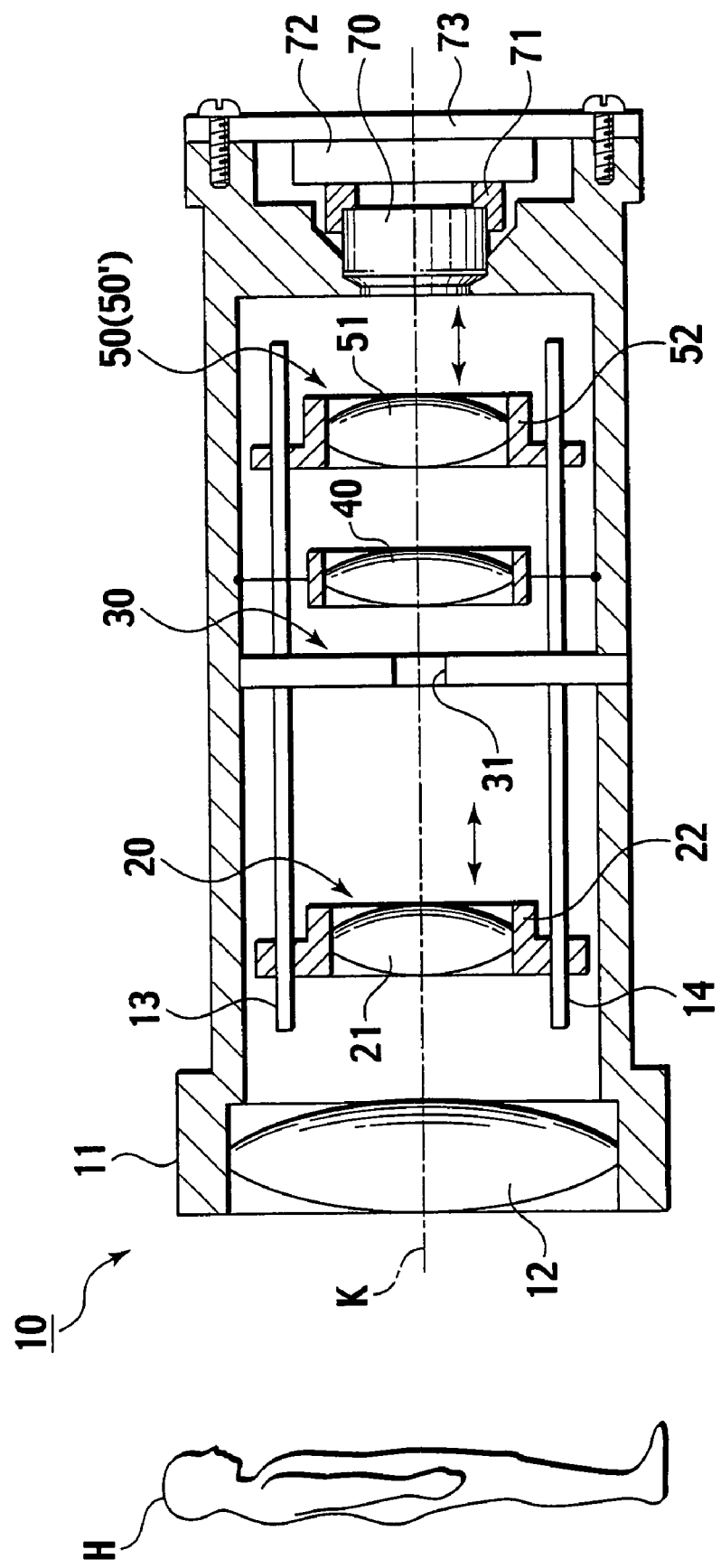
FIG. 3 is a configuration view for conceptually illustrating a lens tube of a video camera according to an exemplary embodiment of the present invention.
Figure 4:
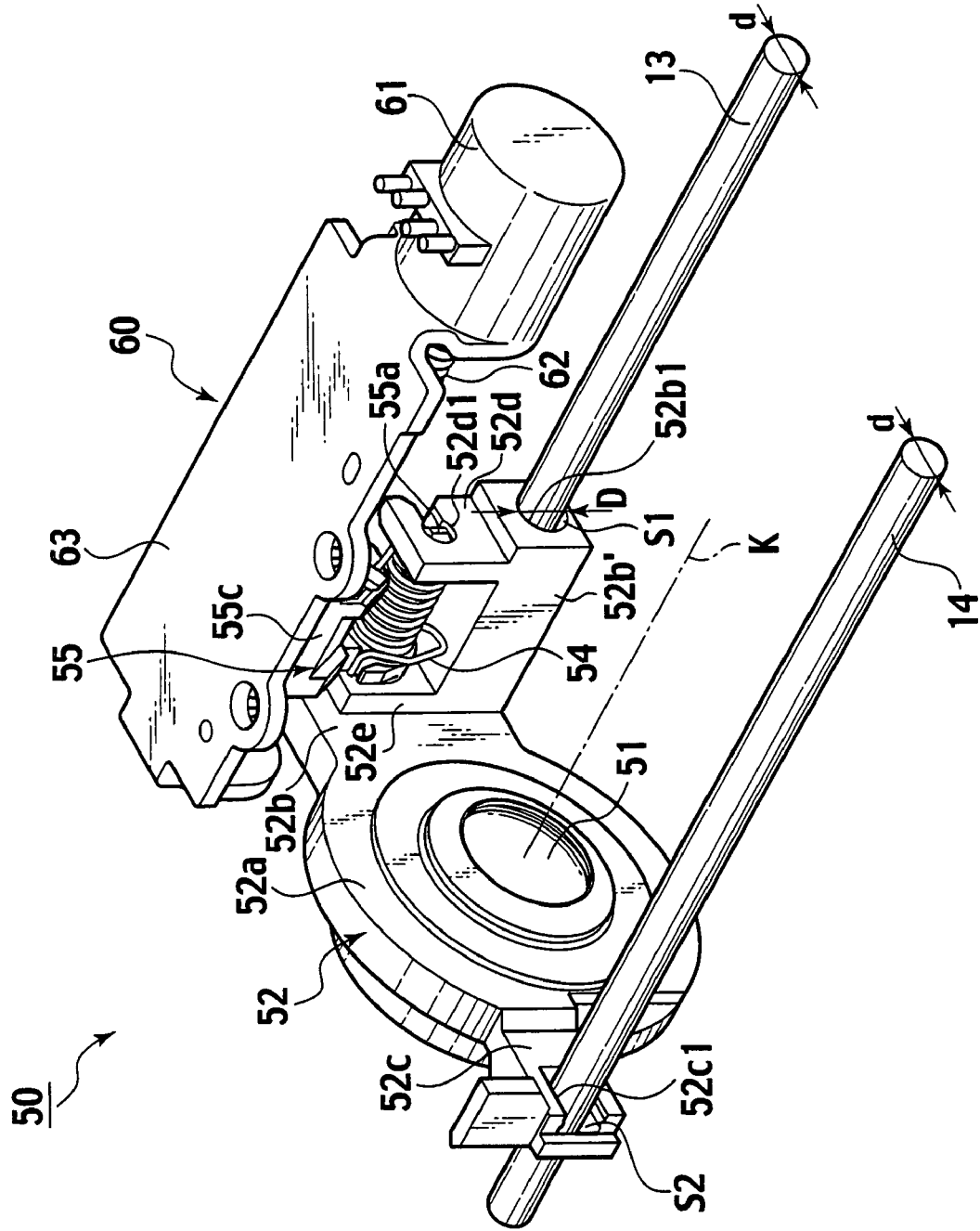
FIG. 4 is a perspective view of a focus lens driving device according to the exemplary embodiment of the present invention.

As shown in FIG. 3, a lens tube 11 forms the entirety of a lens tube unit 10. The lens tube 11 receives therein a front lens (or front lens assembly) 12, a first guide shaft 13, a second guide shaft 14, a variable power lens driving unit 20 including a variable power lens (or variable power lens assembly) 21 and a variable power lens frame 22, a diaphragm driving unit 30 including a diaphragm 31, a fixed master lens (or fixed master lens assembly) 40, a focus lens driving unit 50 including a focus lens (or focus lens assembly) 51 and a focus lens frame 52, an optical low-pass filter 70, a rubber 71, an image sensor 72 and an image sensor holder 73. It is noted that the lens tube 11 forming the entirety of the lens tube unit 10 of a video camera is really divided into at least two parts so that the lens tube 11 receives a plurality of optical components therein. However, the lens tube 11 is drawn in FIG. 3 not to be divided into at least two parts in order to illustrate configuration of the lens tube unit 10 conceptually.

The front lens 12, the variable power lens driving unit 20, the diaphragm driving unit 30, the fixed master lens 40, the focus lens driving unit 50, the optical low-pass filter 70 and the image sensor 72 are arranged in this order from before backward in the lens tube 11. The front lens 12 firstly receives an image of a subject H. The variable power lens driving unit 20 moves the variable power lens frame 22 to which the variable power lens 21 is fixed, in the direction of an optical axis K along the first and second guide shafts 13 and 14 arranged parallel to the optical axis K. The diaphragm driving unit 30 opens or closes the diaphragm 31 to adjust the amount of light with respect to the image of the subject H. The focus lens driving unit 50 moves the focus lens frame 52 to which the focus lens 51 is fixed, in the direction of the optical axis K along the first and second guide shafts 13 and 14. The focus lens 51 is used to adjust a focus of the image of the subject H, in cooperation with the fixed master lens 40. The optical low-pass filter 70 prevents a false signal generated by high-frequency components with respect to the image of the subject H from being sent. The image sensor 72 is mounted to the lens tube 11 via the optical low-pass filter 70 and the rubber 71 and carries out a photoelectric conversion with respect to the image of the subject H. The image sensor holder 73 closes the rear end of the lens tube 11 and fixes the image sensor 72 to the lens tube 11.

The first and second guide shafts 13 and 14 are fixed to the lens tube 11 at front and rear ends thereof. The front lens 12 produces the image of the subject H on the image sensor 72 such as a CCD (charge-coupled device) in cooperation with the variable power lens 21, the fixed master lens 40 and the focus lens 51. Each of the front lens 12, the variable power lens 21, the fixed master lens 40 and the focus lens 51 is a single lens or a lens assembly consisting of a plurality of lenses.

Since the variable power lens driving unit 20 has the substantially same configuration as the focus lens driving unit 50, we will describe the configuration of the focus lens driving unit 50 below, as one example of a lens driving device configured to move a lens frame to which a lens (or lens assembly) is fixed, in the direction of a optical axis of the lens, with reference to FIGS. 4 to 7.

As shown in FIGS. 4 to 7, in the focus lens driving unit 50 mounted in the lens tube 11, the focus lens frame 52 to which the focus lens 51 is fixed is moved in the direction of the optical axis K along the first and second guide shafts 13 and 14.

The focus lens frame 52 is made of a block resin material and integrally formed by a forming process. The focus lens frame 52 comprises a lens fixing portion 52a, a first arm 52b, a first hole portion 52b' and a second arm 52c. The focus lens 51 is fixed to the lens fixing portion 52a of the focus lens frame 52. The first and second arms 52b and 52c extend from the outer periphery portion of the lens fixing portion 52a in two opposite directions. The first arm 52b faces to the second arm 52c across the optical axis K.

A first hole portion 52b' extends from an end portion of the first arm 52b along the optical axis K by a certain length. A first hole (hereinafter called a circular hole) 52b1 passes through the first hole portion 52b' and the end portion of the first arm 52b along the optical axis K. The first guide shaft 13 is inserted into the circular hole 52b1. An interspace S1 is defined between the first guide shaft 13 and an inner wall of the first hole portion 52b' because the diameter D of the circular hole 52b1 is slightly larger than the diameter d of the first guide shaft 13. For example, the interspace S1 is located on the lower side of the circular hole 52b1.

A second hole (hereinafter called a rectangle hole) 52c1 passes through the second arm 52c along the optical axis K. The length of the rectangle hole 52c1 is shorter than that of the circular hole 52b1. The second guide shaft 14 is inserted into the rectangle hole 52c1. An interspace S2 is defined between the second guide shaft 14 and an inner wall of the second arm 52C1 because the length of the short side of the rectangle hole 52c1 is slightly larger than the diameter d of the second shaft 14. For example, the interspace S2 is located on the lower side of the rectangle hole 52c1. It is noted that the cross-section of the second hole 52c1 may be substantially shaped like a letter U (not shown).

A pair of rack member supporting pieces 52d and 52e extends upward from an upper surface of the first hole portion 52b' which is located above a barycentric position of the focus lens frame 52. The rack member supporting pieces 52d and 52e extend along a direction perpendicular to the optical axis K and are arranged at a distance along the optical axis K. The rack member supporting piece 52e abuts on the end portion of the first arm 52b at one side thereof. The rack member supporting pieces 52d and 52e are provided with circular holes 52d1 and 52e1 (not shown), respectively. The circular holes 52d1 and 52e1 pass through the rack member supporting pieces 52d and 52e, respectively.

A rack member 55 has a pair of shaft portions 55a and 55b (not shown) on the lower side thereof and is supported swingablly by the rack member supporting pieces 52d and 52e. More specifically, the shaft portions 55a and 55b are respectively inserted into the circular holes 52d1 and 52e1, which allows the rack member 55 to be supported by the rack member supporting pieces 52d and 52e. Thereby, the rack member 55 is capable of swinging in a direction perpendicular to the optical axis K.

The rack member 55 has a rack piece 55c and a lead screw facing piece 55d on the upper side thereof. The rack piece 55c and the lead screw facing piece 55d extend upward and are arranged at a distance along the direction perpendicular to the optical axis K. Therefore, the cross-section of the rack member 55 is substantially shaped like a letter U on the upper side of the rack member 55. The rack piece 55c is provided with rack teeth 55c1 on the inner surface thereof. The rack teeth 55c1 each leans at an angle substantially coinciding with a lead angle of a lead screw 62.

A focus motor assembly 60 is mounted to the lens tube 11 and located above the barycentric position of the focus lens frame 52. The focus motor assembly 60 has a focus motor 61, the lead screw 62 and a motor attachment bracket 63. The lead screw 62 is fixed to an output shaft of the focus motor 61 at one end portion thereof. The focus motor 61 is attached to one end portion of the motor attachment bracket 63. The lead screw 62 is rotatably supported at both end portions of the motor attachment bracket 63 so as to rotate along the optical axis K. The lead screw 62 is inserted between the rack piece 55c and the leas screw facing piece 55d. The inserted lead screw 62 meshes with the rack teeth 55c1 by pressing the rack piece 55c toward the lead screw 62 by biasing force of a torsion spring (spring member) 54.

The torsion spring 54 is fixed to the rack member supporting piece 52e at one end portion thereof and to the rack piece 55c at the other end portion thereof. Protrusions (not shown) respectively extend in opposite directions of shaft portions 55a and 55b on the lower side of the rack member 55. The protrusions are inserted into a hollow portion of the torsion spring 54 from both ends of the hollow portion.

Figure 5:
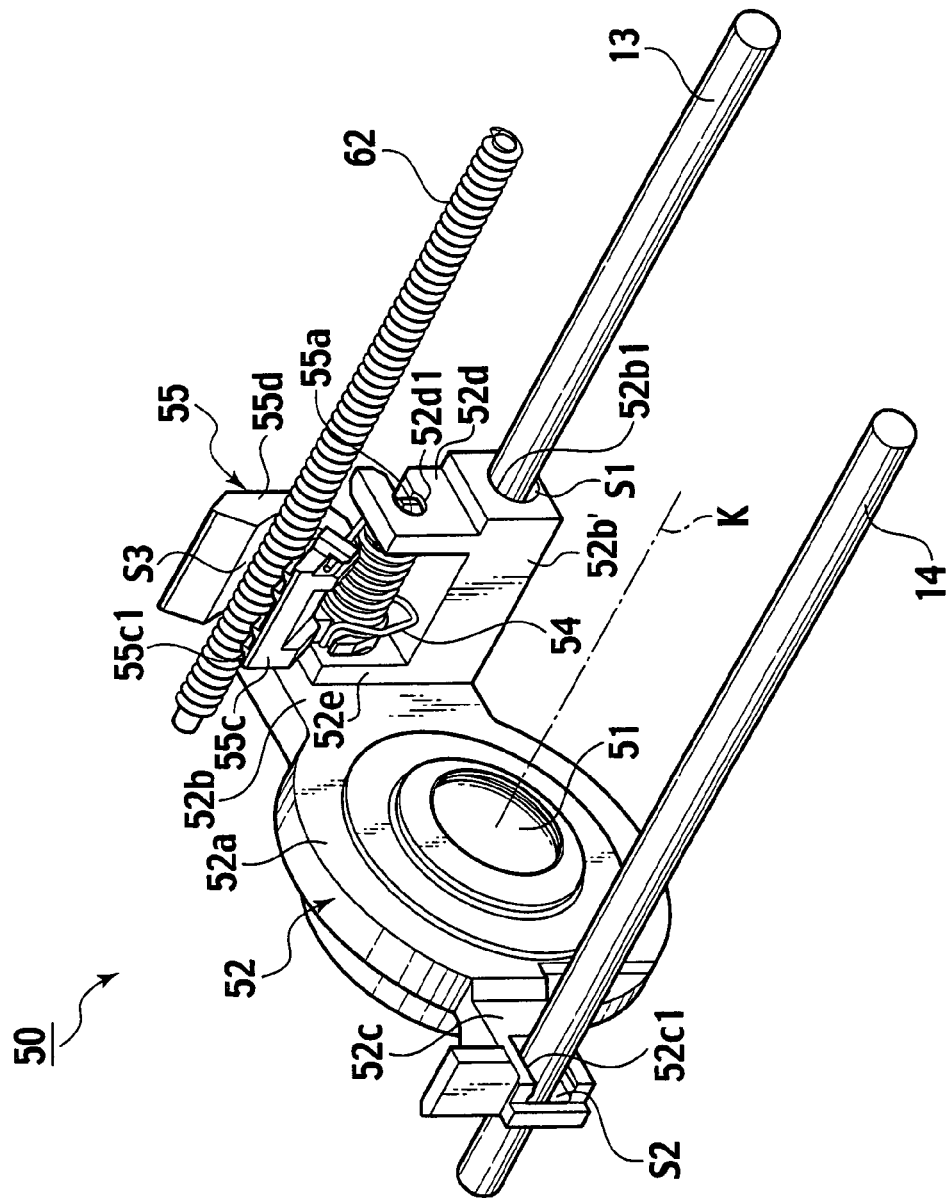
FIG. 5 is a perspective view of the focus lens driving device from which a focus motor and a motor attachment bracket of a focus motor assembly are removed according to the exemplary embodiment of the present invention.
Figure 6:
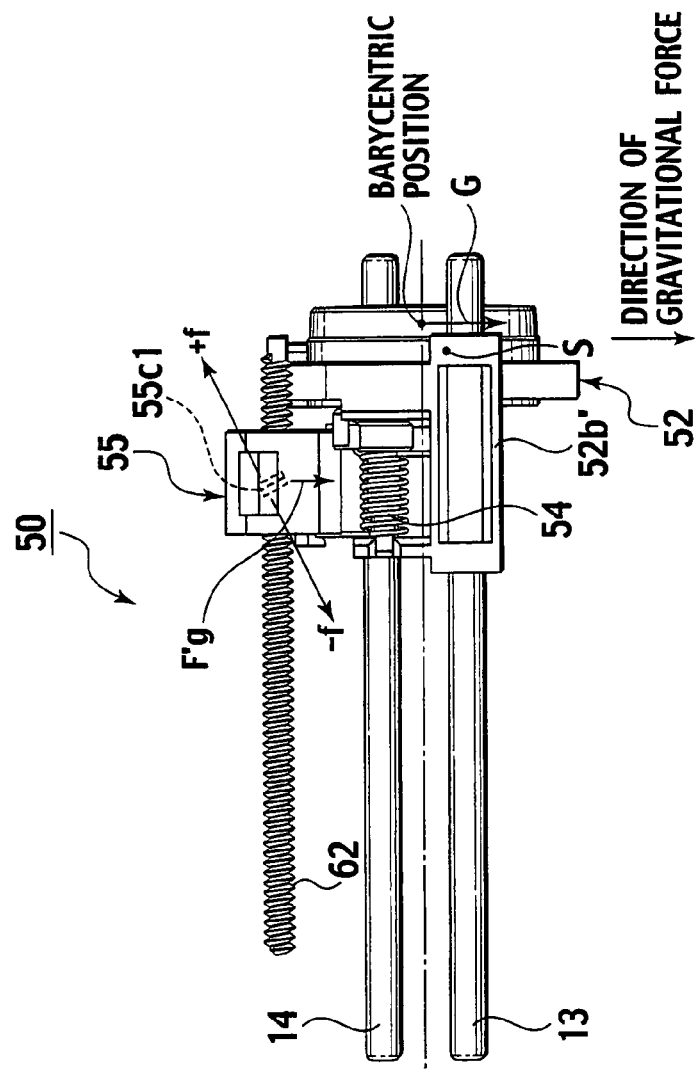
FIG. 6A is a front view of the focus lens driving device according to the exemplary embodiment of the present invention.
FIG. 6B is a side view of the focus lens driving device according to the exemplary embodiment of the present invention.

An interspace S3 is defined between the lead screw 62 and the lead screw facing piece 55d when the lead screw 62 meshes with the rack teeth 55c1 (see FIG. 5).

As shown in FIG. 6A, the rack piece 55c and the rack teeth 55c1 lean with respect to the direction of gravitational force (vertical direction). More specifically, the rack piece 55c and the rack teeth 55c1 lean such that a direction in which reaction force F' acts crosses a face connecting the first and second guide shafts 13 and 14, wherein the reaction force F' is generated when the lead screw 62 meshes with the rack teeth 55c1 by pressing the rack piece 55c toward the lead screw 62 by the biasing force of the torsion spring 54. In the exemplary embodiment, in the cross-sectional view of the focus lens frame 52, the direction in which the reaction force F' acts points to a substantial halfway point of a line connecting center axes of the first and second guide shafts 13 and 14.

Figure 7:
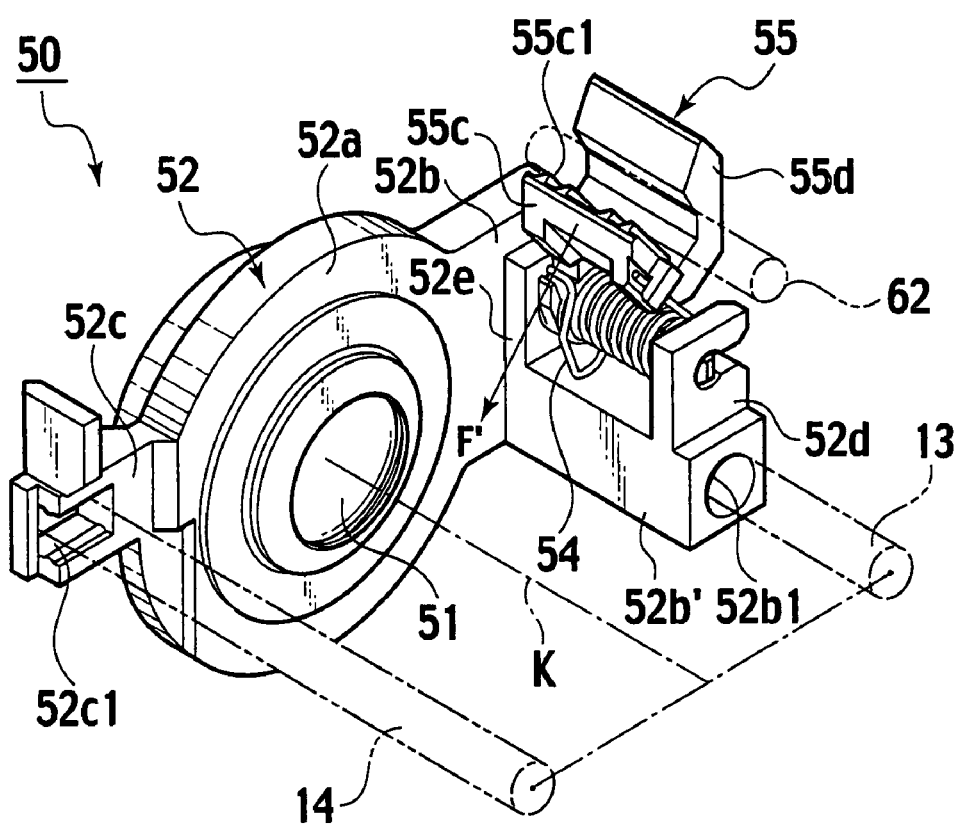
FIG. 7 is a perspective view for illustrating reaction force from a lead screw meshing with rack teeth in the focus lens driving device according to the exemplary embodiment of the present invention.

Under this configuration, when the output shaft of the focus motor 61 is rotated, the lead screw 62 also rotates in a clockwise direction or an anticlockwise direction in accordance with the rotation of the output shaft. The rotation of the lead screw 62 allows the focus lens frame 52 supporting the rack member 55 that includes the rack teeth 55c1 meshing with the lead screw 62, to move forward or backward along the optical axis K while the focus lens frame 52 is guided by the first and second guide shafts 13 and 14. At this time, as shown in FIGS. 6A and 7, in the cross-sectional view of the focus lens frame 52, the direction in which the reaction force F' acts points to a substantial halfway point of a line connecting the center axes of the first and second guide shafts 13 and 14, because the rack piece 55c and the rack teeth 55c1 lean such that the direction in which the reaction force F' acts crosses a substantial center line of the face connecting the first and second shafts 13 and 14 and the rack teeth 55c1 mesh with the lead screw 62 by pressing the rack piece 55c toward the lead screw 62 by the biasing force of the torsion spring 54. The focus lens frame 52 is biased toward a direction of not defying gravity with respect to the first and second guide shafts 13 and 14, due to the reaction force F' acting from the lead screw 62 to the rack teeth 55c1. This prevents the focus lens frame 52 from rotating around the optical axis K.

Thereby, the focus lens frame 52 smoothly slides on the first and second guide shafts 13 and 14 in a stable manner, which reduces the biasing force of the torsion spring 54. This further reduces load torque of the lead screw 62 to consume lower amounts of power of the focus motor 61.

Further, as shown in FIG. 6B, when we assume that a supporting point S is a contact point where the first guide shaft 13 contacts an inner wall of the circular hole 52b1 (see FIGS. 4 and 5) adjacent to the barycentric position of the focus lens frame 52 to which the focus lens 51 is attached, moment given to the focus lens frame 52 due to a vertical component $F'_g$ of the reaction force F' is set such that it is always larger than the sum of moment given to the focus lens frame 52 due to reaction force +f forced by the lead angle of the lead screw 62 at a time when the lead screw 62 rotates in the clockwise direction and moment given to the focus lens frame 52 due to gravity G of the focus lens frame 52 to which the focus lens 51 is attached. In this case, each moment is calculated by multiplying each force by effort distance from the supporting point S to a point where the each force acts.

As a result, an image tremble or an image jump does not occur because the focus lens frame 52 does not rise from the first guide shaft 13 due to the reaction force +f forced by the lead angle of the lead screw 62 not to lean around the supporting point S.

On the other hand, since the moment given to the focus lens frame 52 due to the vertical component $F'_g$ has the same direction as moment given to the focus lens frame 52 due to reaction force −f forced by the lead angle of the lead screw 62 at a time when the lead screw 62 rotates in the anticlockwise direction, the focus lens frame 52 does not rise from the first guide shaft 13 due to the reaction force −f forced by the lead angle of the lead screw 62 not to lean around the supporting points. This prevents an image tremble or an image jump from occurring.

Therefore, even if a wobbling motion frequently introduced into the recent autofocus technology is carried out, the focus lens driving unit 50 can prevent an image tremble or an image jump from occurring. It is noted that the wobbling motion is a motion in which the focus lens frame 52 to which the focus lens 51 is attached is reciprocated by a small amplitude vibration in a short time.

COMPARATIVE EXAMPLE

Next, another lens driving device 50' will be described below in detail, with reference to FIGS. 8 to 11, as a comparative example of the focus lens driving device 50. In FIGS. 8 to 11, the same elements as those of the lens driving device 50 are given the same reference numerals.

Figure 8:
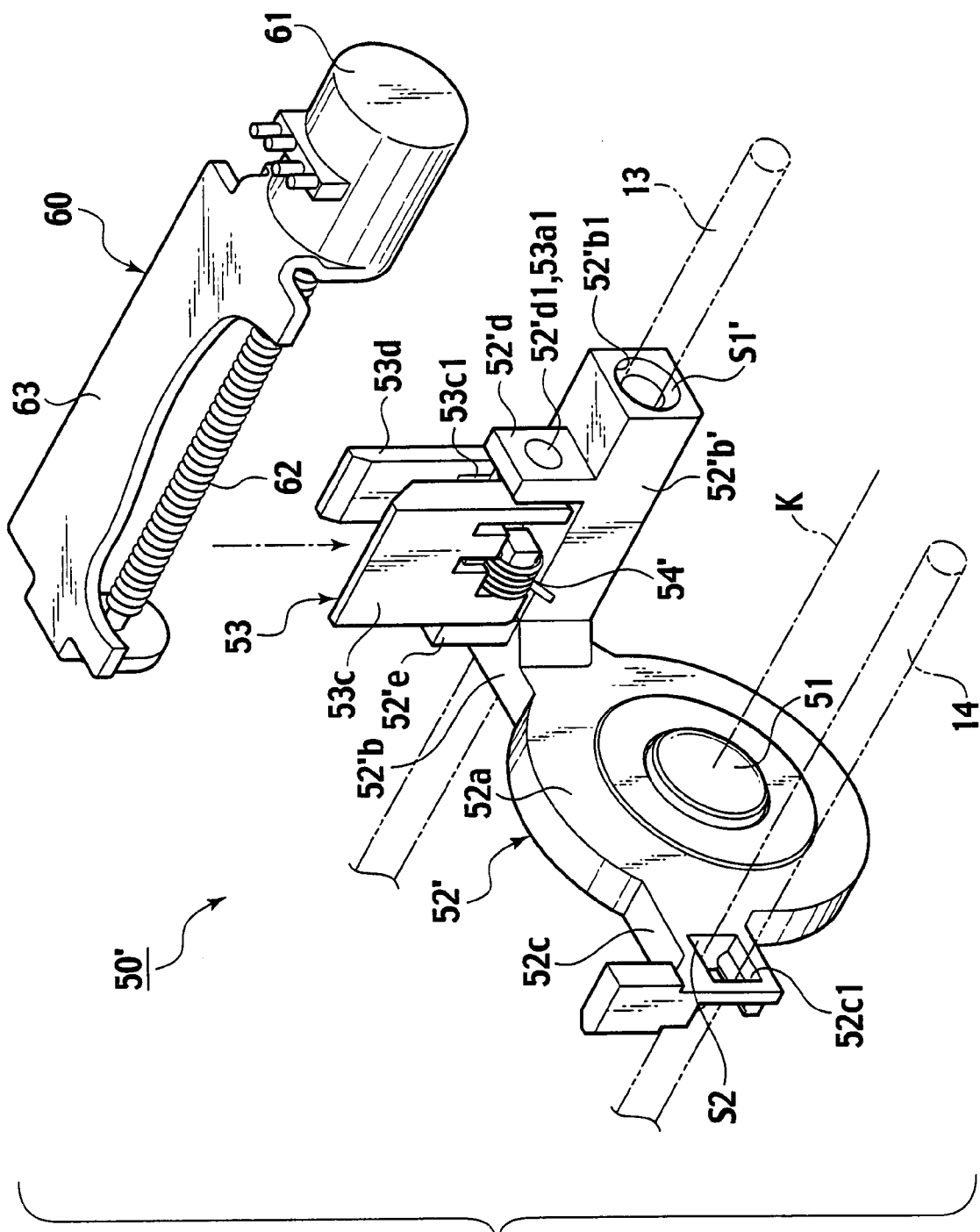
FIG. 8 is a partly exploded perspective view for illustrating a focus lens driving unit exploded partly as a comparative example of the focus lens driving device according to the exemplary embodiment of the present invention.
Figure 9A:
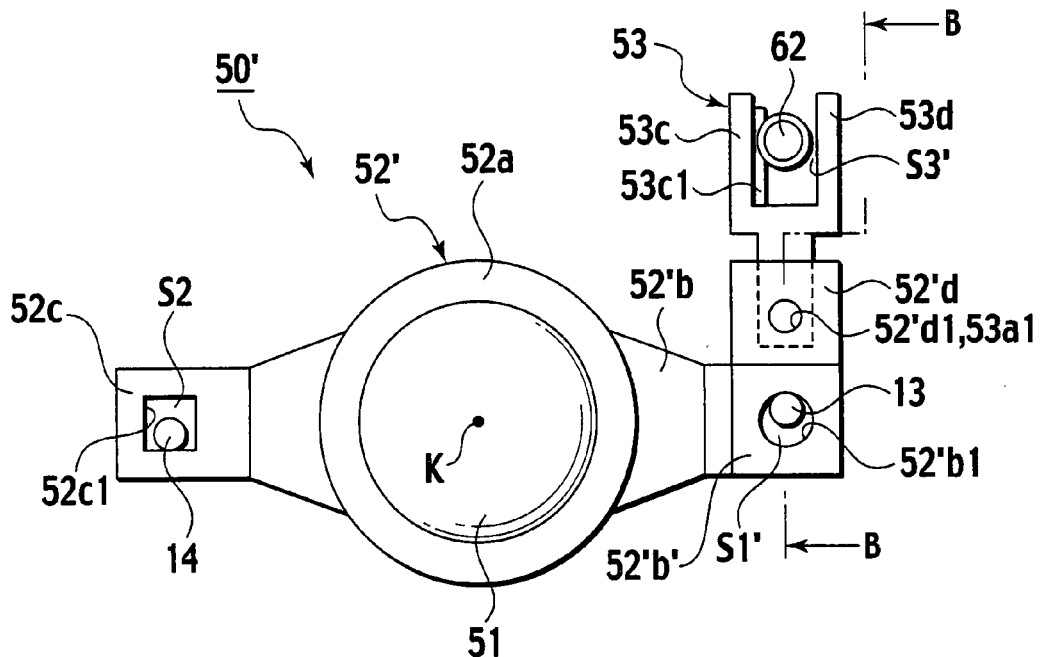
FIG. 9A is a front view of the focus lens driving unit shown in FIG. 8.
Figure 9B:
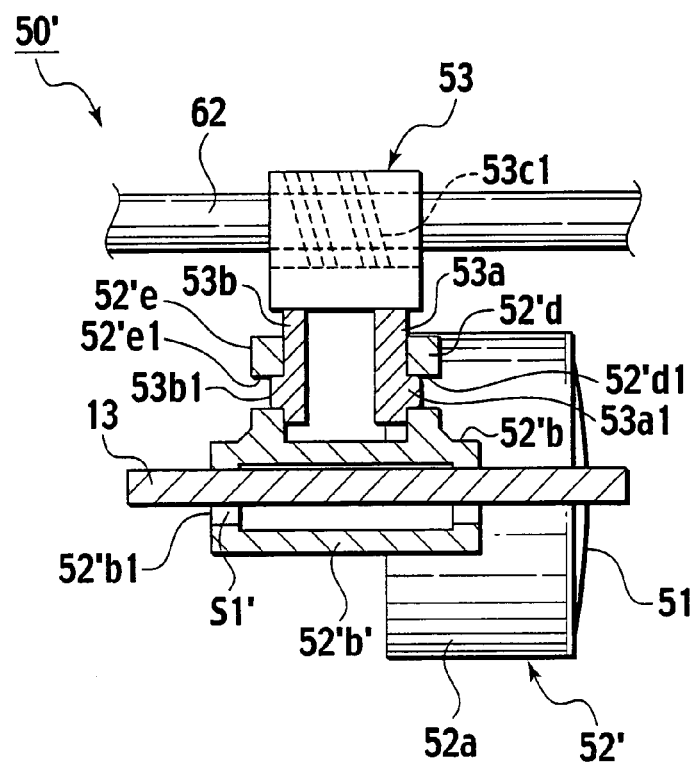
FIG. 9B is a side view of the focus lens driving unit viewed from an arrow direction B shown in FIG. 9A.

As shown in FIGS. 8, 9A and 9B, in a focus lens driving unit 50' mounted in the lens tube 11, a focus lens frame 52' to which the focus lens 51 is fixed is moved in the direction of the optical axis K along the first and second guide shafts 13 and 14.

The focus lens frame 52' is made of a block resin material and integrally formed by a forming process. The focus lens frame 52' comprises the lens fixing portion 52a, a first arm 52'b, a first hole portion 52'b' and the second arm 52c. The focus lens 51 is fixed to the lens fixing portion 52a of the focus lens frame 52'. The first and second arms 52'b and 52c extend from the outer periphery portion of the lens fixing portion 52a in two opposite directions. The first arm 52'b faces to the second arm 52c across the optical axis K.

A first hole portion 52'b' extends from an end portion of the first arm 52'b along the optical axis K by a certain length. A first hole (hereinafter called a circular hole) 52'b1 passes through the first hole portion 52'b' along the optical axis K. The first guide shaft 13 is inserted into the circular hole 52'b1. An interspace S1' is defined between the first guide shaft 13 and an inner wall of the first hole portion 52'b1 because the diameter D of the circular hole 52'b1 is slightly larger than the diameter d of the first guide shaft 13. For example, the interspace S1' is located on the lower side of the circular hole 52'b1.

The second hole (hereinafter called a rectangle hole) 52c1 passes through the second arm 52c along the optical axis K. The length of the rectangle hole 52c1 is shorter than that of the circular hole 52'b1. The second guide shaft 14 is inserted into the rectangle hole 52c1. The interspace S2 is defined between the second guide shaft 14 and an inner wall of the second arm 52C1 because the length of the short side of the rectangle hole 52c1 is slightly larger than the diameter d of the second shaft 14. For example, the interspace S2 is located on the upper side of the rectangle hole 52c1. It is noted that the cross-section of the second hole 52c1 may be substantially shaped like a letter U (not shown).

A pair of rack member supporting pieces 52'd and 52'e extends upward from an upper surface of the first hole portion 52'b' which is located above a barycentric position of the focus lens frame 52'. The rack member supporting pieces 52'd and 52'e extend along a direction perpendicular to the optical axis K and are arranged at a distance along the optical axis K. The rack member supporting pieces 52'd and 52'e are provided with circular holes 52'd1 and 52'e1 (which is shown in only FIG. 9B), respectively. The circular holes 52'd1 and 52'e1 pass through the rack member supporting pieces 52'd and 52'e, respectively.

A rack member 53 has a pair of plates 53a and 53b on the lower side thereof and is supported swingablly by the rack member supporting pieces 52'd and 52'e. More specifically, the plates 53a and 53b extend downward from the rack member 53 and are arranged at a distance along the optical axis K. The plates 53a and 53b are provided with shaft portions 53a1 and 53b1 (which is shown in only FIG. 9B) at the bottoms thereof, respectively. The shaft portions 53a1 and 53b1 extend from the plates 53a and 53b in two opposite directions. The shaft portions 53a1 and 53b1 are respectively inserted into the circular holes 52'd1 and 52'e1, which allows the rack member 53 to be supported by the rack member supporting pieces 52'd and 52'e. Thereby, the rack member 53 is capable of swinging in a direction perpendicular to the optical axis K.

The rack member 53 has a rack piece 53c and a lead screw facing piece 53d on the upper side thereof. The rack piece 53c and the lead screw facing piece 53d extend upward and are arranged at a distance along the direction perpendicular to the optical axis K. Therefore, the cross-section of the rack member 53 is substantially shaped like a letter U on the upper side of the rack member 53. The rack piece 53c is provided with rack teeth 53c1 on the inner surface thereof. The rack teeth 53c1 each leans at an angle substantially coinciding with the lead angle of the lead screw 62.

The focus motor assembly 60 is mounted to the lens tube 11 and located above the barycentric position of the focus lens frame 52'. The focus motor assembly 60 has the focus motor 61, the lead screw 62 and the motor attachment bracket 63. The lead screw 62 is fixed to an output shaft of the focus motor 61 at one end portion thereof. The focus motor 61 is attached to one end portion of the motor attachment bracket 63. The lead screw 62 is rotatably supported at both end portions of the motor attachment bracket 63 so as to rotate along the optical axis K. The lead screw 62 is inserted between the rack piece 53c and the leas screw facing piece 53d. The inserted lead screw 62 meshes with the rack teeth 53c1 by pressing the rack piece 53c toward the lead screw 62 by biasing force of a torsion spring (spring member) 54'.

An interspace S3' is defined between the lead screw 62 and the lead screw facing piece 53d when the lead screw 62 meshes with the rack teeth 53d (see FIG. 9A).

Under this configuration, when the output shaft of the focus motor 61 is rotated, the lead screw 62 also rotates in a clockwise direction or an anticlockwise direction in accordance with the rotation of the output shaft. The rotation of the lead screw 62 allows the focus lens frame 52' supporting the rack member 53 that includes the rack teeth 53c1 meshing with the lead screw 62, to move forward or backward along the optical axis K while the focus lens frame 52' is guided by the first and second guide shafts 13 and 14.

At this time, the focus lens frame 52' smoothly slide on the first and second guide shafts 13 and 14 because the interspace S1' is defined between the first guide shaft 13 and the inner wall of the first hole portion 52'b' and the interspace S2 is defined between the second guide shaft 14 and the inner wall of the second arm 52C1. However, if the lead screw 62 has eccentricity and/or warpage caused by a dimension error at the time of fabricating the lead screw 62, the lead screw 62 eccentrically rotates.

This causes the lead screw 62 to tremble. The tremble is transmitted to the focus lens frame 52' via the rack member 53. If the focus lens frame 52' trembles, the tremble is not restrained due to the interspaces S1' and S2, which brings a surface tremble to an image provided by the focus lens 51.

The above-described problem occurs in not only the focus lens driving unit 50' but also the variable power lens driving unit 20 having the substantially same configuration as the focus lens driving unit 50'. More specifically, when a moving direction of the variable power lens frame 22 is suddenly changed, the variable power lens frame 22 trembles according to the law of inertia. This brings an image jump.

In order to address the above problem, moment is given to the focus lens frame 52' to prevent the focus lens frame 52' from trembling. It is noted that the moment is produced by reaction force F which is generated by pressing the rack teeth 53$c1$ toward the lead screw 62 by the biasing force of the torsion spring 54' and acts in a direction from the lead screw 62 toward the rack teeth 53$c1$ (see FIG. 11).

Figure 10A:
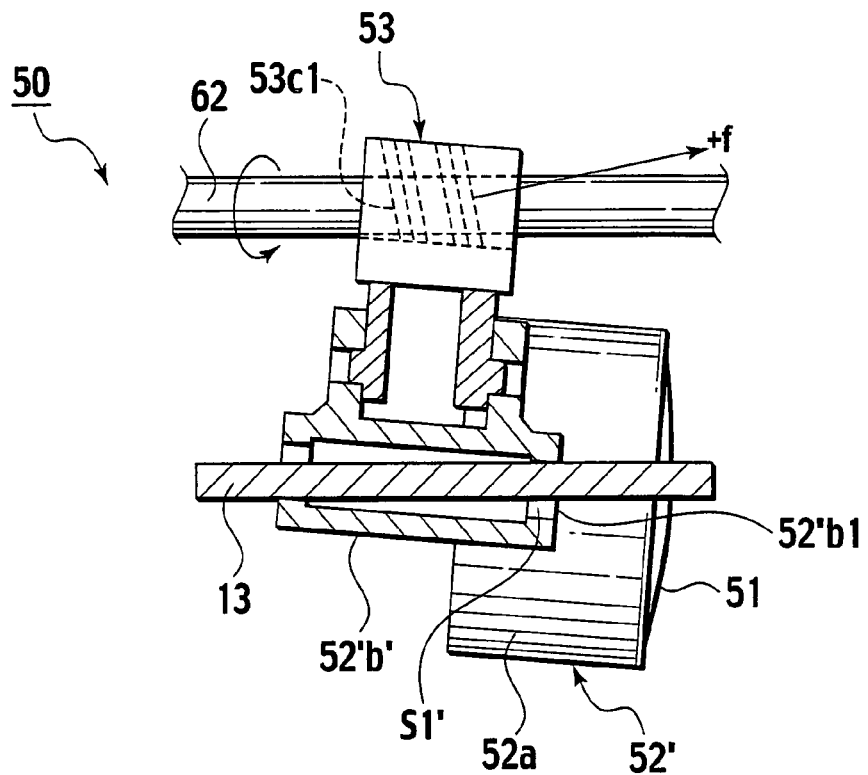
FIG. 10A is a cross-sectional view of the focus lens driving unit shown in FIG. 8 when a lead screw rotates in an anticlockwise direction.
Figure 10B:
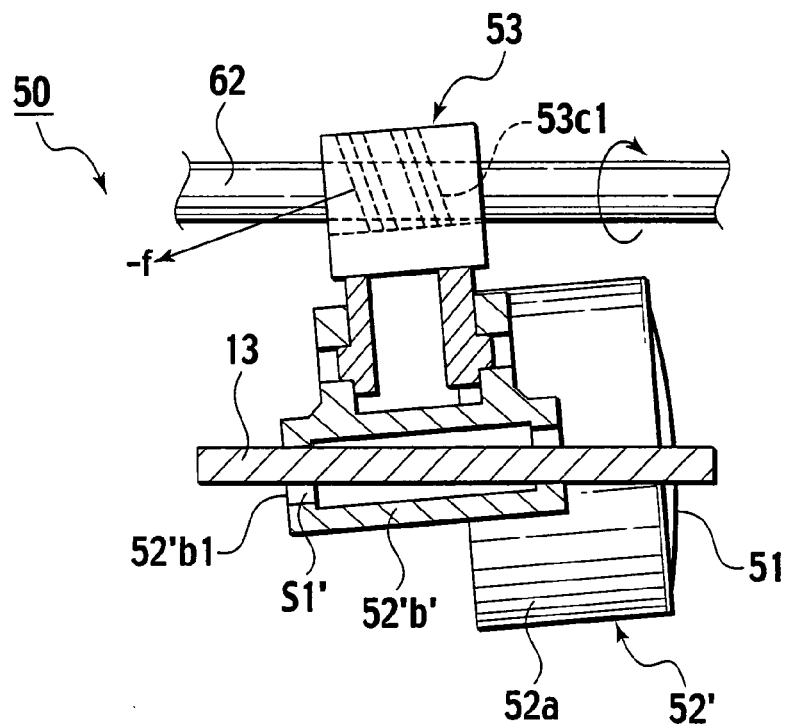
FIG. 10B is a cross-sectional view of the focus lens driving unit shown in FIG. 8 when the lead screw rotates in a clockwise direction.

However, when the lead screw 62 rotates in the anticlockwise direction, reaction force +f acting in an arrow direction shown in FIG. 10A is generated because the rack teeth 53$c1$ and the lead screw 62 have the same lead angles. Also, when the lead screw 62 rotates in the clockwise direction, reaction force −f acting in an arrow direction shown in FIG. 10B is generated because the rack teeth 53$c1$ and the lead screw 62 have the same lead angles. At this time, the vertical component of the reaction force +f (or −f) makes the focus lens frame 52' move in the vertical direction of the focus lens frame 52'. For example, this leans the focus lens frame 52' in a clockwise direction or an anticlockwise direction with respect to an axis direction of the first guide shaft 13.

Figure 11:
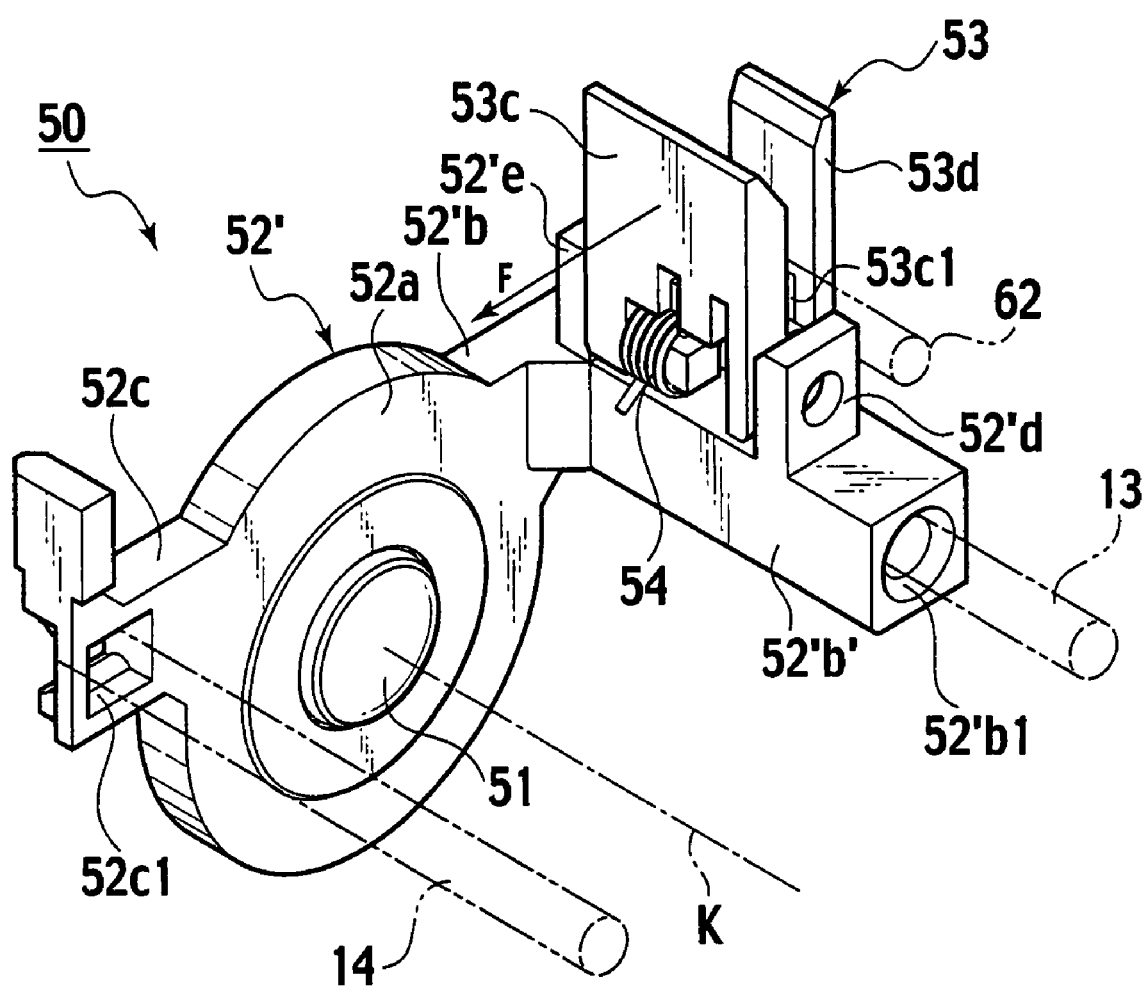
FIG. 11 is a perspective view for illustrating reaction force from the lead screw meshing with rack teeth in the focus lens driving unit shown in FIG. 8.

More specifically, since the rack piece 53$c$ and the lead screw facing piece 53$d$ extend along the direction of gravitational force (vertical direction), the reaction force F acts in a direction substantially parallel to the face connecting the first and second guide shafts 13 and 14 when the rack teeth 53$c1$ is pressed toward the lead screw 62 by the biasing force of the torsion spring 54' (see FIG. 11). Therefore, the moment given to the focus lens frame 52 due to reaction force +f (or −f) is not restrained by using the reaction force F.

That is, in this comparative example, since the reaction force F acts in the direction substantially parallel to the face connecting the first and second guide shafts 13 and 14, the focus lens frame 52' is not always pressed toward the first and second guide shafts 13 and 14. Thus, as shown in FIG. 9A, even if the first guide shaft 13 contacts with the upper side of the circular hole 52'$b1$ (the first guide shaft 13 does not rise from the first guide shaft 13), the focus lens frame 50' rotates around the optical axis K such that the second guide shaft 14 contacts with the lower side of the rectangle hole 52'$c1$. Therefore, if the wobbling motion is carried out, the focus lens driving unit 50 can not prevent an image tremble or an image jump from occurring.

The focus lens frame 52' has two degrees of freedom because the focus lens frame 52' is capable of moving along the optical axis K and rotating around the optical axis K. In contrast, the focus lens frame 52 has one degree of freedom because a degree of freedom of rotating the focus lens frame 52 around the optical axis K can be eliminated by using the reaction force F'. Therefore, the focus lens frame 52 with the focus lens 51 can smoothly move along the optical axis K without leaning.

Although the focus motor assembly 60 is located above the barycentric position of the focus lens frame 52 in the exemplary embodiment, the location is not restricted to only the above-described location. The focus motor assembly 60 may be located below the barycentric position of the focus lens frame 52. Even in this case, the rack piece 55$c$ and the rack teeth 55$c1$ are formed to lean such that the direction in which reaction force F' acts crosses a face connecting the first and second guide shafts 13 and 14.

What is claimed is:

1. A lens driving device comprising:
   a lens frame to which one or more lenses are attached;
   a first guide shaft arranged parallel to an optical axis of the one or more lenses, inserted into a first hole of the lens frame and configured to guide the lens frame to move along the optical axis;
   a second guide shaft arranged parallel to the optical axis, inserted into a second hole of the lens frame which is opposed to the first hole across the optical axis and configured to guide the lens frame in cooperation with the first guide shaft to move along the optical axis;
   a rack member on which rack teeth are formed along the optical axis and supported by the lens frame in the vicinity of the first hole so that the rack member can swing in a direction perpendicular to the optical axis;
   a lead screw configured to mesh with the rack teeth, which each leans at an angle substantially coinciding with a lead angle of the lead screw, to move the lens frame forward or backward along the optical axis at a time of rotating in a clockwise direction or an anticlockwise direction by using a drive power of a motor; and
   a spring member configured to press the rack teeth toward the lead screw to generate reaction force acting from the lead screw toward the rack teeth,
   wherein the rack teeth are formed on the rack member such that a direction in which the reaction force acts crosses a face connecting the first and second guide shafts.

2. The lens driving device according to claim 1, wherein moment given to the lens frame due to a vertical component of the reaction force is set such that it is always larger than the sum of moment given to the lens frame due to reaction force forced by the lead angle of the lead screw at a time when the lead screw rotates and moment given to the lens frame due to gravity of the lens frame to which the one or more lenses are attached, in a case where a supporting point is a contact point where the first guide shaft contacts an inner wall of the first hole adjacent to a barycentric position of the lens frame to which the one or more lenses are attached.

3. The lens driving device according to claim 1, wherein an interspace is defined between the first guide shaft and an inner wall of the first hole.

4. The lens driving device according to claim 1, wherein an interspace is defined between the second guide shaft and an inner wall of the second hole.

* * * * *